United States Patent
Krause et al.

(10) Patent No.: US 10,148,359 B2
(45) Date of Patent: Dec. 4, 2018

(54) HIGH SPEED SIGNAL GENERATOR

(71) Applicant: Ciena Corporation, Hanover, MD (US)

(72) Inventors: David Krause, Nepean (CA); Charles Laperle, Kanata (CA); Kim B. Roberts, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/593,805

(22) Filed: May 12, 2017

(65) Prior Publication Data

US 2017/0250756 A1    Aug. 31, 2017

Related U.S. Application Data

(60) Continuation of application No. 14/846,848, filed on Sep. 7, 2015, now Pat. No. 9,654,220, which is a division of application No. 14/102,856, filed on Dec. 11, 2013, now Pat. No. 9,130,678, which is a division of application No. 12/692,065, filed on Jan. 22, 2010, now Pat. No. 8,693,876.

(60) Provisional application No. 61/146,901, filed on Jan. 23, 2009.

(51) Int. Cl.
| | |
|---|---|
| *H04B 1/66* | (2006.01) |
| *H04B 10/61* | (2013.01) |
| *H04B 10/04* | (2006.01) |
| *H04B 10/516* | (2013.01) |
| *H04B 10/50* | (2013.01) |
| *H04L 27/26* | (2006.01) |

(52) U.S. Cl.
CPC ....... *H04B 10/516* (2013.01); *H04B 10/5055* (2013.01); *H04L 27/2627* (2013.01)

(58) Field of Classification Search
CPC .............. H04B 10/516; H04B 10/5053; H04B 10/5055
USPC ................. 398/183, 193, 192, 182
See application file for complete search history.

(56) References Cited

U.S. PATENT DOCUMENTS

| | | |
|---|---|---|
| 6,029,059 A | 2/2000 | Bojer |
| 6,445,476 B1 | 9/2002 | Kahn et al. |

(Continued)

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

A high speed signal generator comprises a digital signal processing (DSP) block configured to process an input digital signal to generate in parallel a first digital sub-band signal having frequency components within a first spectral range and a second digital sub-band signal having frequency components within the first spectral range. A first Digital-to-Analog Converter (DAC) is configured to process the first digital sub-band signal to generate a first analog sub-band signal and a second DAC is configured to process the second digital sub-band signal to generate a second analog sub-band signal. A combiner is to combine the first analog sub-band signal and the second analog sub-band signal to generate an output analog signal having frequency components covering a substantially continuous spectral range from a lower frequency $f_1$ to a higher frequency $f_2$. The substantially continuous spectral range is substantially wider than a width of the first spectral range, and the lower frequency $f_1$ is less than or equal to one-third of the higher frequency $f_2$.

20 Claims, 10 Drawing Sheets

(56) References Cited

U.S. PATENT DOCUMENTS

| | | | |
|---|---|---|---|
| 6,506,160 B1 * | 1/2003 | Van Stralen | G01S 15/8952 600/459 |
| 7,266,306 B1 * | 9/2007 | Harley | H04B 10/505 398/182 |
| 7,676,161 B2 | 3/2010 | Roberts et al. | |
| 2001/0054974 A1 | 12/2001 | Wright | |
| 2002/0196860 A1 | 12/2002 | Ohtaki | |
| 2003/0072494 A1 | 4/2003 | Onno | |
| 2006/0127102 A1 | 6/2006 | Roberts et al. | |
| 2006/0216039 A1 | 9/2006 | Kim et al. | |
| 2006/0281996 A1 * | 12/2006 | Kuo | A61B 5/02405 600/509 |
| 2007/0053449 A1 | 3/2007 | Adachi | |
| 2009/0052556 A1 * | 2/2009 | Fernandez | H03M 1/662 375/241 |
| 2009/0238580 A1 | 9/2009 | Kikuchi | |
| 2011/0222854 A1 | 9/2011 | Roberts et al. | |
| 2014/0093253 A1 | 4/2014 | Krause | |
| 2014/0161469 A1 | 6/2014 | Krause et al. | |
| 2014/0341595 A1 | 11/2014 | Harley et al. | |

* cited by examiner

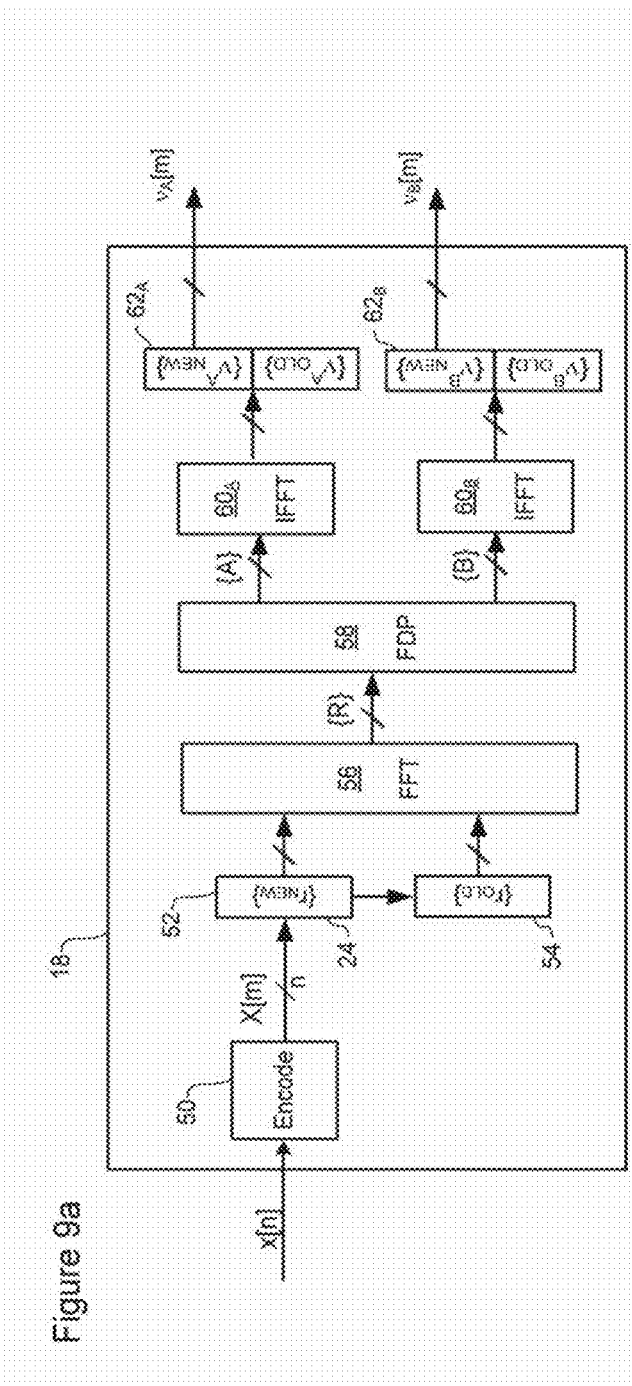
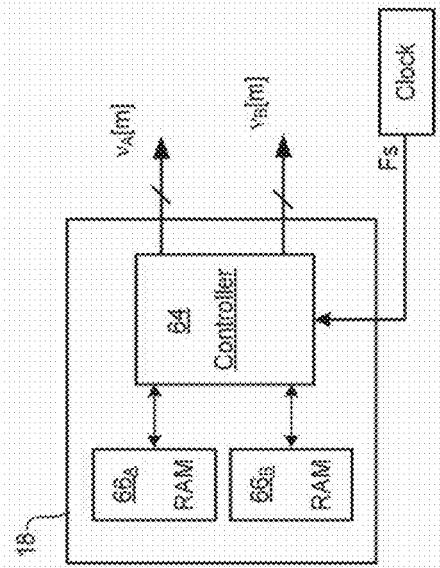
Figure 9a
Figure 9b

HIGH SPEED SIGNAL GENERATOR

CROSS-REFERENCE TO PRIOR APPLICATIONS

This application is a continuation of U.S. patent application Ser. No. 14/846,848 filed Sep. 7, 2015, which is a divisional of U.S. patent application Ser. No. 14/102,856, now U.S. Pat. No. 9,130,678, which is a divisional of U.S. patent application Ser. No. 12/692,065, now U.S. Pat. No. 8,693,876, which is based on, and claims benefit of, U.S. provisional patent application 61/146,901 filed Jan. 23, 2009, the entire contents of all of which are hereby incorporated herein by reference.

TECHNICAL FIELD

The present invention relates generally to optical communication systems, and in particular to a high-speed signal generator.

BACKGROUND

Referring to FIG. 1a, in an optical communications system, a transmitter 2 typically comprises a signal generator 4 for converting a digital signal X(n) to be transmitted into a drive signal S(t) which drives a modulator 6 (such as, for example, an Mach-Zehnder modulator (MZM) so as to modulate a narrow-band optical carrier generated by a laser 8 to generate a corresponding optical channel signal, which may then multiplexed into an optical fiber link for transmission through the optical communications system to a receiver. Typically, the drive signal S(t) is a radio frequency (RF) analog electrical signal. In such cases, the signal generator 4 typically includes a digital signal processor (DSP) 10 cascaded with a digital-to-analog converter (DAC) 12. The DSP 10 operates to process the digital signal X(n) to generate a corresponding digital drive signal X'(m) which is designed in accordance with the performance and operating requirements of the DAC 12. The DAC 12 operates in a conventional manner to convert the digital drive signal X'(m) into the required analog RF drive signal S(t) for modulation onto the optical carrier.

In simple cases, the processing implemented by the DSP 10 will typically include de-serializing a serial digital signal X(n) to generate the digital drive signal X'(m) as a parallel digital sample stream; adjusting a number of bits resolution of the digital drive signal X'(m) to match that of the DAC input; and adjusting a timing of the digital drive signal X'(m) to match the sample rate of the DAC. For example, consider an arrangement in which the signal generator 4 receives a serial digital signal X(n) comprising QPSK encoded data. In this case, the DSP 10 may deserialize the received serial bit stream to generate into a two-bit parallel digital drive signal X'(m) so that the DAC 12 will output a four-level analog drive signal S(t). In additional, the DSP 10 may adjust signal timing so that bits of the serial digital signal X(n) can be latched into the DSP 10 at a timing of the input digital signal X(n), and words of the two-bit parallel digital drive signal X'(m) are latched into DAC 12 at the sample rate Fs of the DAC 12.

In more complex arrangements, the DSP 10 may also apply a desired encoding scheme to the digital signal X(n). Various encoding schemes may be used as desired, including but not limited to On-Off Keying (OOK), Phase Shift Keying (PSK), Quadrature Phase Shift Keying (QPSK), Quadrature Amplitude Modulation (QAM) and Forward Error Correction (FEC). The DSP 10 may also apply a compensation function (i.e. pre-distortion) to the digital drive signal X'(m) to compensate impairments of the optical communications link, such as, for example, dispersion.

As channel bit rates rise to 100 Giga-bits per second (Gb/s) and beyond, high speed signal generators are required to generate the necessary electrical drive signals for modulation. High speed signal generators may also be useful in other fields, such has high speed wireless communications.

A limitation of known techniques is that, for a DAC having a sample rate of Fs, the frequency spectrum of the output signal S(t) consists of a baseband symmetrically distributed about DC (0 Hz) and extending to ±Fs/2, and corresponding harmonic bands symmetrically distributed about ±nFs (where n is an integer). These harmonic bands are duplicates of the baseband, and so do not contribute to the bit-rate of the optical channel. For example, consider a scenario in which the DAC is supplied with a digital drive signal X'(m) defining a pure sinusoid having a frequency of fo. The frequency spectrum of the analog output of the DAC will contain baseband frequency components at ±fo, and first harmonic frequency components at −Fs±fo and at Fs±fo, as may be seen in FIG. 1b. In order to avoid aliasing, a low-pass filter characteristic 14 having a cut-off frequency of Fs/2 is typically used to attenuate the harmonic bands, leaving only the baseband components in the drive signal S(t) output from the signal generator.

As is well known in the art, the analog drive signal S(t) output from the signal generator is inherently limited to frequency components between DC (0 Hz) and ½ of the sample rate Fs of the DAC. For example, a DAC having a sample rate Fs=10 Giga-Samples per second (GS/s) can generate an analog output signal S(t) with frequency components between DC and Fs/2=5 GHz. In a system that utilizes Nyquist sampling (2 samples per symbol), such a DAC would be suitable for use in a signal generator that operates at a maximum symbol rate of 5 Giga-baud (Gbaud). In the case of QPSK encoding (2 bits per symbol), this translates into a maximum channel bit rate of 10 Gb/s. In high speed optical communications systems, the sample rate of the DAC used to generate the analog drive signal may be the limiting factor in determining the maximum bit-rate of an optical channel.

The highest speed commercially available DAC currently known to the inventors has a maximum sample rate of Fs=20 GS/s (available from Tektronix). This allows for the generation of an analog output drive signal with spectral content from DC to 10 GHz, and supports symbol rates of up to 10 Gbaud with Nyquist sampling. A high speed signal source is needed that can generate signals with spectral content from DC to at least 20 GHz, and further increases in spectral width are expected to be needed in the future.

Techniques and high speed signal sources for generating high bandwidth signals remain highly desirable.

SUMMARY

There are disclosed methods and techniques for generating high-speed signals.

In one aspect of the invention, there is provided a high-speed signal generator. A digital signal processing (DSP) block generates a set of N (where N is an integer and N≥2) parallel digital sub-band signals, each digital sub-band signal having frequency components within a spectral range between 0 Hz and ±Fs/2. A respective Digital-to-Analog Converter (DAC) processes each digital sub-band signal to generate a corresponding analog sub-band signal, each DAC having a sample rate of Fs. A combiner combines the analog sub-band signals to generate an output analog signal having frequency components within a spectral range between 0 Hz and ±NFs/2.

The present invention provides a method for generating an analog signal with frequency content from DC to NFs/2 (N≥2), using an arrangement of N identical, lower speed, synchronous DACs, a RF mixing circuit, and a RF summation circuit. The lower speed DACs produce content from DC to ±Fs/2. After the arrangement of the mixer and summer, the output content will be from DC to ±NFs/2.

This method is suitable for generating pre-distorted signals in electrical domain compensation of optical dispersion and/or multi-level signals for higher modulation formats (M-ary PSK, M>4, QAM) in high-bit rate optical communication systems (for example, >200 Gb/s).

BRIEF DESCRIPTION OF THE DRAWINGS

Representative embodiments of the invention will now be described by way of example only with reference to the accompanying drawings, in which:

FIGS. 9a and 9b are block diagrams schematically illustrating respective representative digital signal processors usable in embodiments of the present invention;

It will be noted that throughout the appended drawings, like features are identified by like reference numerals.

DETAILED DESCRIPTION OF PREFERRED EMBODIMENTS

The present invention provides a technique for generating high speed analog signals having a spectral range from DC to an integer multiple of one half of the DAC sample rate. Thus, in a system in which the DAC sample rate Fs is 10 GS/s, the output analog signal can contain frequency components between DC (0 Hz) and NFs/2, where N integer, N≥2.

In very general terms, the systems in accordance with the present invention include a digital signal processor for generating a digital drive signal X'(m) in the form of N parallel digital sub-band signals $v_X[m]$, where x is an index. Each digital sub-band signal contains frequency components lying within a respective sub-band of the digital drive signal X'(m). The width of each sub-band preferably corresponds with one half of the DAC sample rate. Each digital sub-band signal is then converted to a corresponding analog sub-band signal $S_X[t]$ by a respective DAC. The resulting set of analog sub-band signals are then up-converted using respective mixers, with one sub-band not upconverted, and then all sub-bands combined together to yield an output analog signal S'(t) having frequency components spanning a desired spectral range. Anti-aliasing filters and phase delays between the respective sub-band signals can be used to mitigate interference between the analog sub-band signals as required by the implementation. The present invention will be described below with reference to embodiments in which it is desired to generate an output analog signal S(t) containing frequency components between DC (0 Hz) and Fs; that is, where N=2. Extensions of these techniques for the case of N>2, will be apparent to those of ordinary skill in the art upon reading the present specification and drawings, and thus will only be briefly mentioned.

Figure 2:
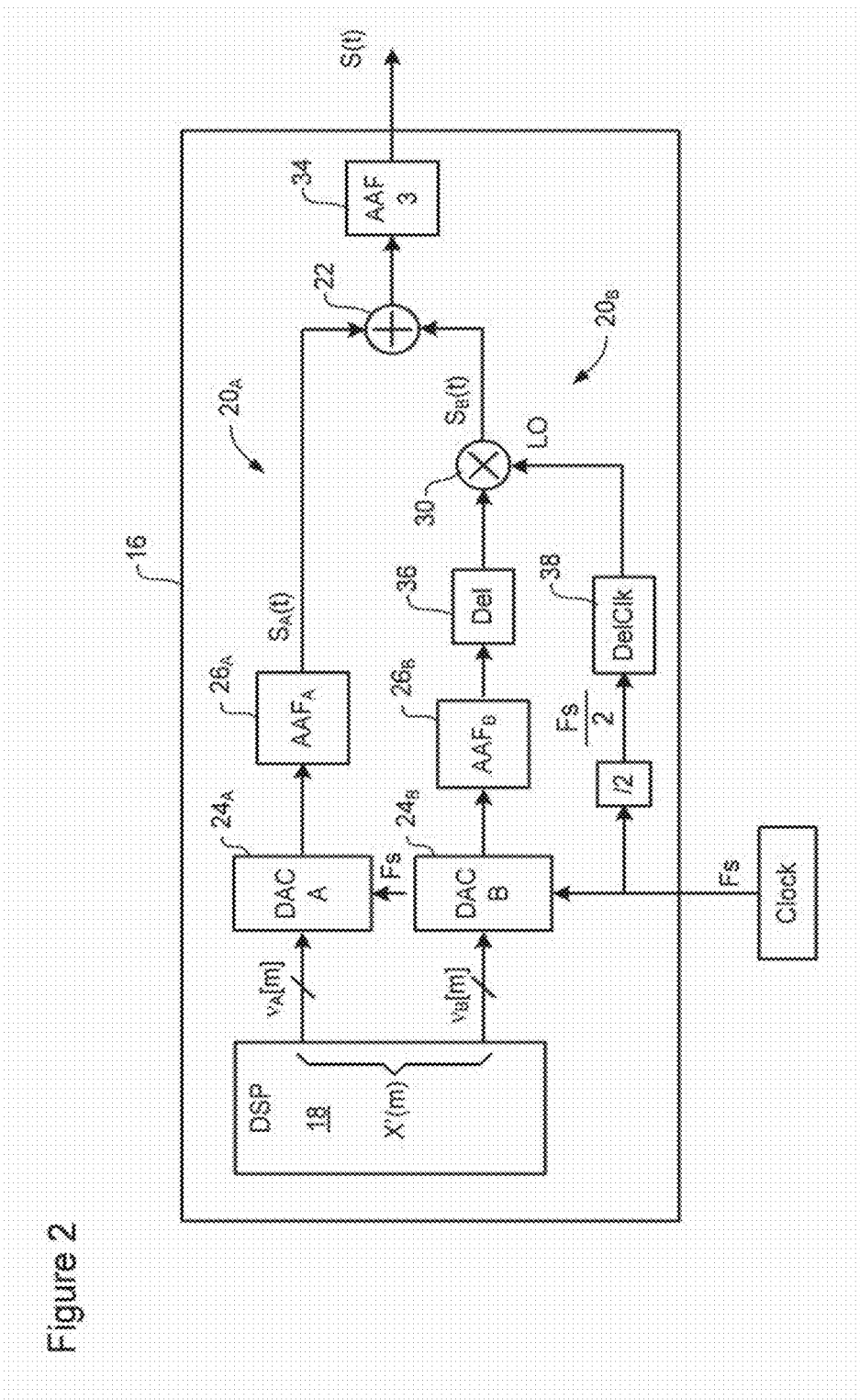
FIG. 2 schematically illustrates a signal generator in accordance with a representative embodiment of the present invention.

FIG. 2 schematically illustrates a signal generator in accordance with a representative embodiment of the present invention. In the embodiment of FIG. 2, the signal generator 16 comprises a DSP 18 cascaded with a parallel pair of analog signal paths $20_A$, $20_B$ which are respectively designed to generate a Low sub-band signal $S_A(t)$ and a High sub-band signal $S_B(t)$. The parallel signal paths $20_A$, $20_B$ are connected to respective inputs of an analog signal combiner 22, which sums the two sub-band signals $S_A(t)$ and $S_B(t)$ to generate the desired high-speed analog driver signal S'(t) at an output of the signal generator 16.

In the illustrated embodiment, the DSP 18 is configured to operate as a signal synthesizer which generates a digital drive signal X'(m) in the form of a pair of parallel digital sub-band signals $v_A[m]$ and $v_B[m]$. The low band signal $v_A[m]$ contains frequency components of the digital drive signal X'(m) lying within a sub-band between DC (0 Hz) and Fs/2, while the high band signal $v_B[m]$ contains frequency components of the digital drive signal X'(m) lying within a sub-band between Fs/2 and Fs. In some embodiments, the digital drive signal X'(m) may be a periodic signal (in time) having a known sequence of bits or symbols, a known bit (or symbol) rate, and a known repetition period. Such a signal is commonly used as a test signal for evaluating performance of optical communications systems, for example.

Figure 3A:
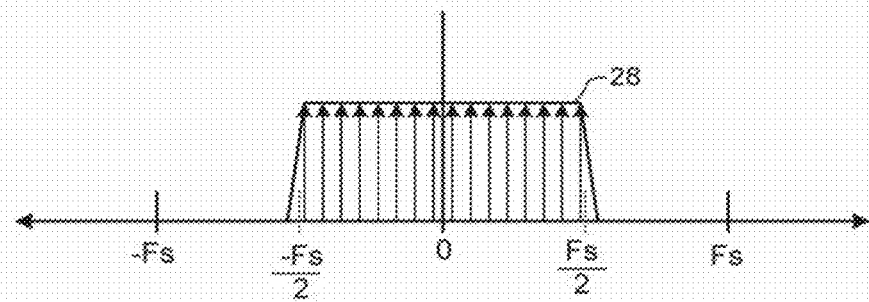
FIGS. 3a-3e show respective RF spectra at various points of the signal generator of FIG. 2.

The low sub-band signal $v_A[m]$ is supplied to a respective low-band signal path $20_A$ comprising a DAC $24_A$ cascaded with an Anti-Aliasing filter (AAF$_A$) $26_A$. Referring to FIGS. 2 and 3a, the DAC $24_A$ operates in a conventional manner to generate an analog low-band signal $S_A(t)$ corresponding to the low sub-band digital signal $v_A[m]$. Accordingly, the analog low-band signal $S_A(t)$ will exhibit a baseband spectrum 28 centered on DC (0 Hz), as may be seen in FIG. 3a. An Anti-aliasing filter (AAF$_A$) $28_A$, which may be configured as a conventional low-pass filter with a cut-off frequency corresponding to Fs/2, is provided to attenuate (harmonic) frequency components lying outside the desired base-band. Preferably, the AAF$_A$ $26_A$ is also designed to exhibit a steep roll-off (for example >20 dB/decade) so as to minimize overlap between residual out-of-band signal components of the analog low-band signal $S_A(t)$ and the high-band signal $S_B(t)$ in the combiner 22. As may be appreciated, the low-band signal path $20_A$ is closely similar to that of a conventional signal generator 4 (FIG. 1a), and operates in substantially the same manner. As such, the analog low-band signal $S_A(t)$ can support a maximum symbol rate corresponding to Fs/2. The High sub-band signal path $20_B$ extends the spectral range of the signal generator 16 to support symbol rates of up to Fs.

Figure 3B:
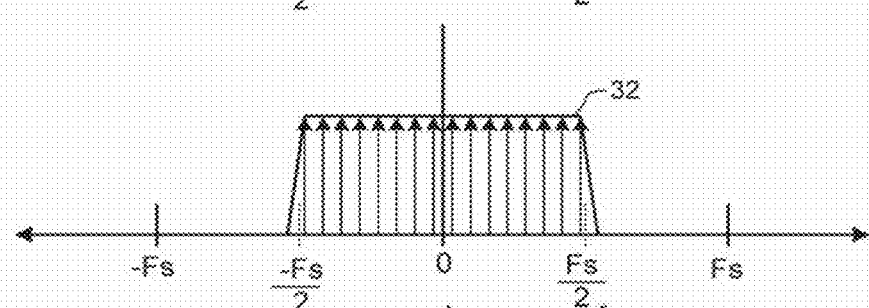

The high band signal $v_B[m]$ is supplied to a respective high-band signal path $20_B$ comprising a DAC $24_B$ cascaded with an Anti-Aliasing filter (AAF) $26_B$ and a mixer 30. Referring to FIGS. 2 and 3b, the DAC $24_B$ operates in a conventional manner to generate an analog signal corresponding to the high sub-band digital signal $v_B[m]$. Accordingly, the analog signal appearing at the output of the DAC $24_B$ will exhibit a baseband spectrum 32 centered on DC, as may be seen in FIG. 3b. The Anti-aliasing filter (AAF) $26_B$, which may be configured as a conventional low-pass filter with a cut-off frequency corresponding to Fs/2, is provided to attenuate (harmonic) frequency components lying outside the desired base-band. Preferably, the AAF $26_B$ is also designed to exhibit a steep roll-off (for example >20 dB/decade) so as to minimize overlap between residual out-of-band signal components of the analog high-band signal $S_B(t)$ and the low-band signal $S_A(t)$ in the combiner 22. The resulting filtered base-band signal is then supplied to an input of the mixer 30.

In the embodiment of FIG. 2, the mixer 30 receives a local oscillator (LO) signal having a frequency corresponding to Fs/2. If desired, the LO signal can be generated by dividing a clock signal by 2, as shown in FIG. 2. Alternatively, a conventional oscillator circuit (such as a Phase-Locked Loop) may be used to produce the LO signal having the desired frequency. The mixer 30 operates in a conventional manner to heterodyne the filtered base-band signal (FIG. 3b) with the LO signal to produce a radio frequency (RF) analog high-band signal $S_B(t)$ having a center frequency corresponding to that of the LO signal, which in this case lies at Fs/2.

Figure 3C:
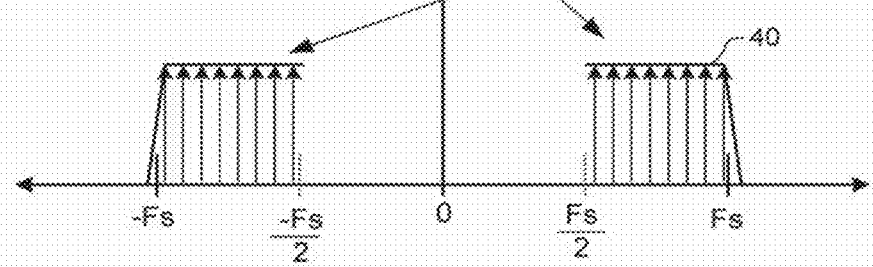

In some embodiments, the mixer 30 is provided as an image rejection mixer. As is known in the art, an image rejection mixer operates to reject one side-band from the RF output. In the embodiment of FIG. 2, this may be utilized by implementing the image rejection mixer such that only the positive side band of the filtered base-band signal (FIG. 3b) input to the mixer 30 appears at the mixer output. This yields a high sub-band analog signal $S_B(t)$ having a spectrum as illustrated in FIG. 3c, in which the upper side band of the input signal has been up-converted to the frequency range extending from Fs/2 to Fs, and its complex conjugate frequency range extending from −Fs/2 to −Fs.

In other embodiments, the mixer 30 is provided as a double side-band mixer. In this case, a high-pass filter (not shown) having a cut-off frequency at Fs/2 (and preferably a steep roll-off) can be provided at the output of the mixer to attenuate frequency components lying below Fs/2, and so yield an output spectrum closely similar to that illustrated in FIG. 3c.

Figure 3D:
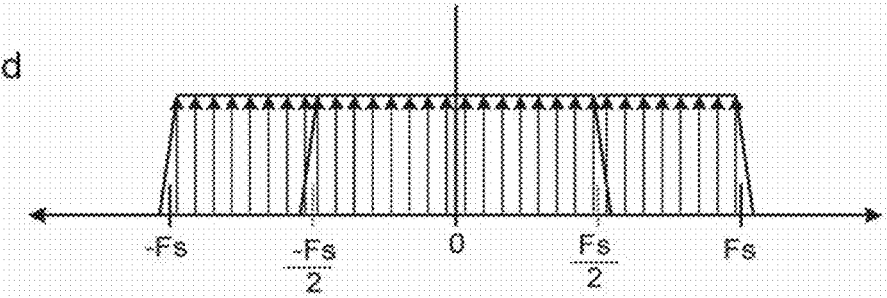

The analog signal combiner 22 can be provided as a conventional RF signal combiner to sum the two analog sub-band signals $S_A(t)$ and $S_B(t)$ to yield an analog drive signal S(t) containing frequency components within a spectral band from DC to Fs, as may be seen in FIG. 3d. If desired, a further Anti-Aliasing Filter 34 can be provided at the output of the signal combiner 22 to remove out-of band noise to obtain the final analog drive signal S(t) shown in FIG. 3e.

The above technique yields an analog driver signal S(t) having frequency components within a spectral range between DC (0 Hz) and Fs. Thus the signal generator of FIG. 2 can be configured to support maximum transmission symbol rates approximately double that of a prior art signal generator that is constructed using exactly the same DAC.

Figure 3E:
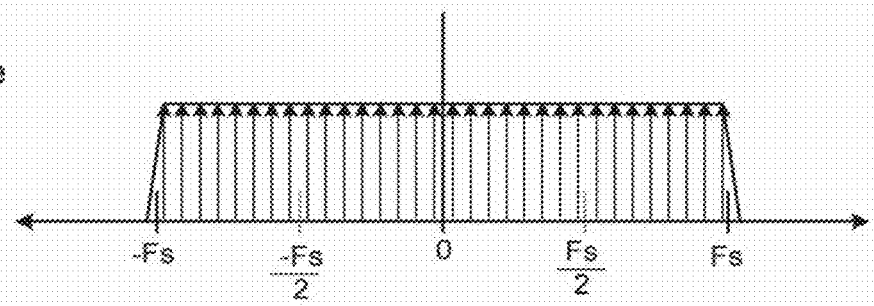

As may be appreciated, each of the analog sub-band signals $S_A(t)$ and $S_B(t)$ contain residual frequency components that extend beyond their respective desired spectral range. Accordingly, when the analog sub-band signals $S_A(t)$ and $S_B(t)$ are combined, these out-of-band frequency components will tend to interfere (particularly in a frequency band around±Fs/2) and produce small errors in the final analog drive signal S(t) (FIG. 3e). As noted above, this interference may be reduced, but not eliminated by using Anti-aliasing filters having a steep roll-off. Further mitigation of small errors may be obtained by providing a non-zero phase off-set between the analog sub-band signals $S_A(t)$ and $S_B(t)$ at the combiner input and correction by digital signal processing. In the embodiment of FIG. 2, an analog delay circuit 36 is provided in the High sub-band path $20_B$ to impose a predetermined phase delay to the high sub-band signal $S_B(t)$. A clock delay 38 circuit is provided in the LO signal path to ensure synchronization between the LO signal and the filtered analog signal at the mixer input. If desired, these delay circuits 36,38 may be tuneable so that a desired phase relationship between the analog sub-band signals $S_A(t)$ and $S_B(t)$ can be established. In some embodiments, a phase offset of 90° between the analog sub-band signals $S_A(t)$ and $S_B(t)$ is established, however other phase offset values may be used, as desired. It will be appreciated that a non-zero the phase offset is beneficial in that it prevents amplification of errors due to constructive interference between the out-of band components of the two sub-band signals $S_A(t)$ and $S_B(t)$.

As may be seen in FIG. 3, only the upper side-band 40 of the high sub-band signal $S_H(t)$ is up-converted and added to the low-sub-band signal $S_L(t)$ to obtain the final output signal S(t). This arrangement is advantageous in that the order of the frequency components is preserved through the mixer and combiner, which simplifies the processing required to generate the respective digital sub-band signals $v_A[m]$ and $v_B[m]$.

As may be appreciated, various methods may be used to generate the digital sub-band signals $v_A[m]$ and $v_B[m]$. For example, U.S. Publication No. 2006/0127102, now U.S. Pat. No. 7,676,161, teaches methods and systems for controlling a transmitter capable of synthesizing an arbitrary optical E-field waveform. In this system, a complex digital signal processor computes a complex multi-bit digital representation of a desired optical E-field. This multi-bit digital representation is then used to synthesize a set of digital driver signals which, when converted to analog (by respective DACs) and supplied to an electrical-to-optical (E/O) converter such as a Mach-Zehnder modulator, will yield an optical signal at an output of the E/O converter that is a high fidelity reproduction of the desired E-field waveform. An advantage of this system is that the desired optical E-field can have any arbitrary spectrum, within the dynamic range of the analog signal paths and the E/O converter. A further advantage of this arrangement is that the synthesized analog drive signals are automatically adjusted for the electrical properties of the analog signal paths between the outputs of the DACs and the output of the E/O converter.

These same techniques can be employed in the high speed signal generator of the present invention. In particular, the transmitter of U.S. Publication No. 2006/0127102 may be modified by replacing the analog signal paths and the E/O converter with the signal paths and combiner of the present signal generator. In this case, the complex digital signal processor computes a complex multi-bit digital representation of a desired analog driver signal S'(t) at the output of the combiner. This multi-bit digital representation is then used to synthesize a set of digital driver signals $v_A[m]$ and $v_B[m]$ which will yield a combiner output signal that is a high fidelity reproduction of the desired analog driver signal, taking into account both the response of the DACs and the electrical properties of the analog signal paths between the DACs and the output of the combiner.

Figure 4:
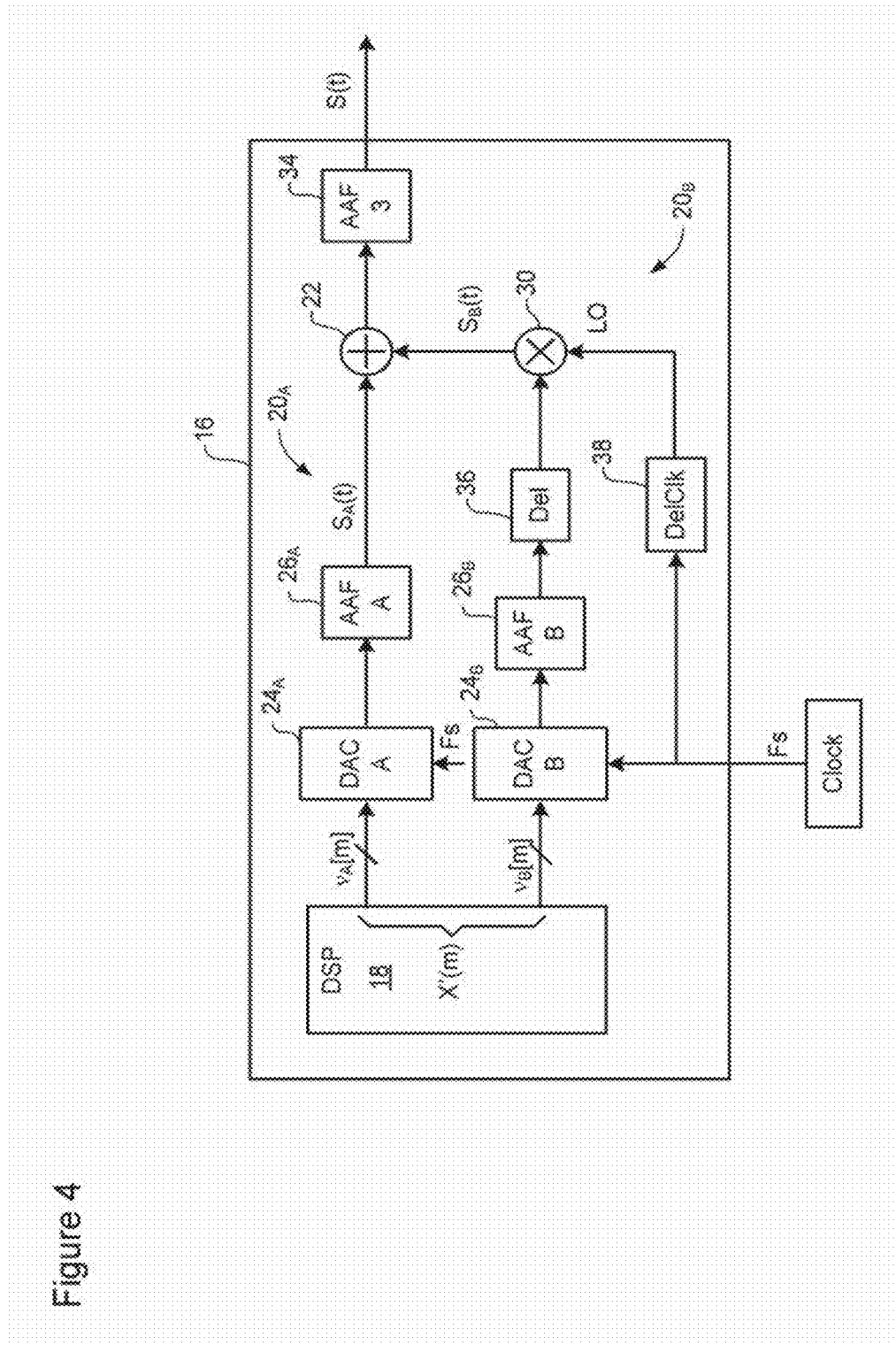
FIG. 4 schematically illustrates a signal generator in accordance with a second representative embodiment of the present invention.
Figure 5A:
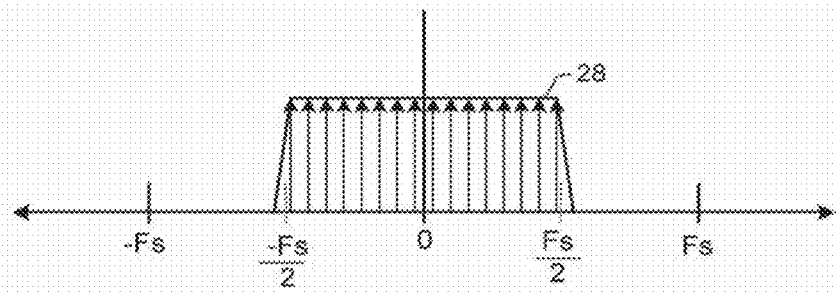
FIGS. 5a-5e show respective RF spectra at various points of the signal generator of FIG. 4.
Figure 5B:
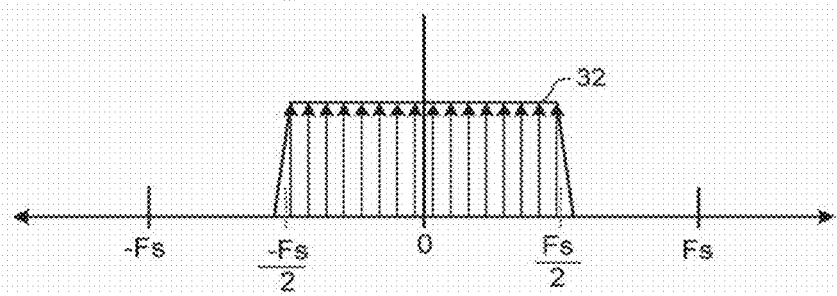
Figure 5C:
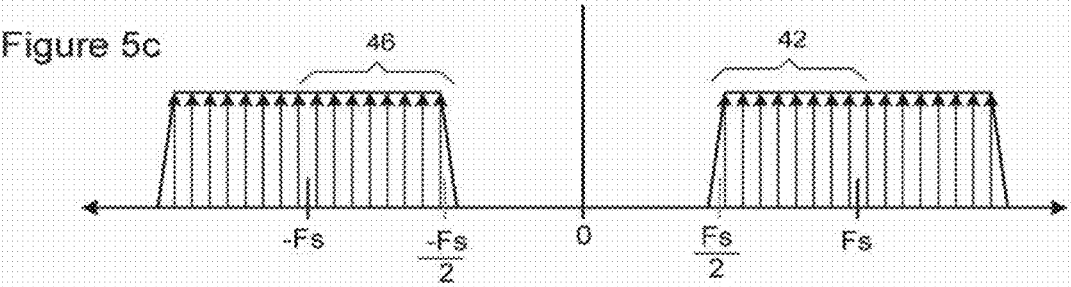
Figure 5D:
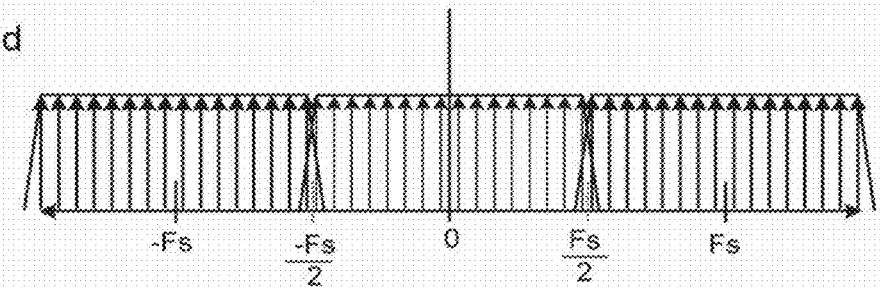
Figure 5E:
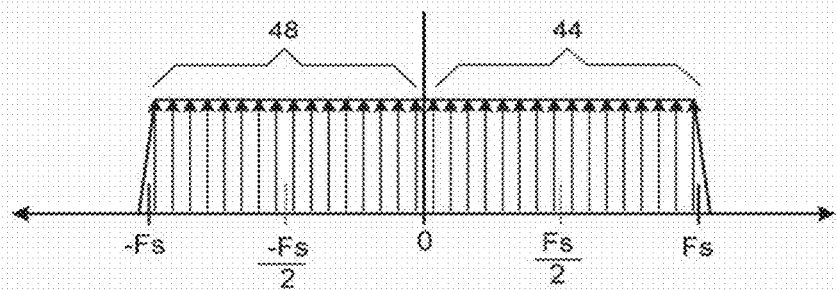

FIGS. 4 and 5 illustrate an alternative embodiment of the signal generator, in which the LO signal supplied to the mixer has a frequency corresponding to Fs. Referring to FIG. 4, the low-band signal path $20_A$ is substantially identical to that of FIG. 2, and operates to generate an analog low-band signal $S_A(t)$ that exhibits a baseband spectrum 28 centered on DC, as may be seen in FIG. 5a. An Anti-aliasing filter (AAF) $26_A$, which may be configured as a described above with reference to FIG. 2, is provided to attenuate (harmonic) frequency components lying outside the desired base-band.

The high-band signal path $20_B$ is closely similar to that of FIG. 2, and supplies an analog filtered base-band signal (FIG. 5b) to an input of the mixer 30, which operates in a conventional manner to heterodyne the filtered base-band signal (FIG. 5b) with the LO signal to produce an RF high-sub-band analog signal $S_B(t)$ signal having a center frequency corresponding to that of the LO signal. The arrangement of FIG. 4 differs from the embodiment of FIG. 2, in that, in the embodiment of FIG. 4 the LO frequency corresponds with Fs. For the case of a double sideband mixer, this operation yields a high-band signal $S_B(t)$ having a spectrum of the form illustrated in FIG. 5c. The analog signal combiner 22 operates to sum the two analog sub-band signals $S_A(t)$ and $S_B(t)$ to yield an analog drive signal S(t) containing frequency components within a spectral band from DC to 3Fs/2, as may be seen in FIG. 5d. The Anti-Aliasing Filter (AAF) 34 provided at the output of the signal combiner 22 attenuates frequency components lying above Fs, to obtain the final analog drive signal S(t) shown in FIG. 5e.

As may be appreciated, in the embodiment of FIGS. 4 and 5, the order of the frequency components within the high-band signal $S_B(t)$ are reversed, in that the lower side band 42 of the high-band signal $S_B(t)$ is coupled into the upper side band 44 of the drive signal S(t), while the upper side band 46 of the high-band signal $S_B(t)$ is coupled into the lower side band 48 of the drive signal S(t). This reversal of frequency components can be compensated by implementing a periodic convolution algorithm to compute the two sub-band digital signals $v_A[m]$ and $v_B[m]$. A representative method for accomplishing this is described below.

Consider the setup shown in FIG. 4, and neglecting the effects of the anti-aliasing filters. As described above, the clock signal at Fs is applied to both DACs and the mixer. The output of the signal generator is assumed to be periodic, and all signals in the time domain are considered to be real.

Figure 1:
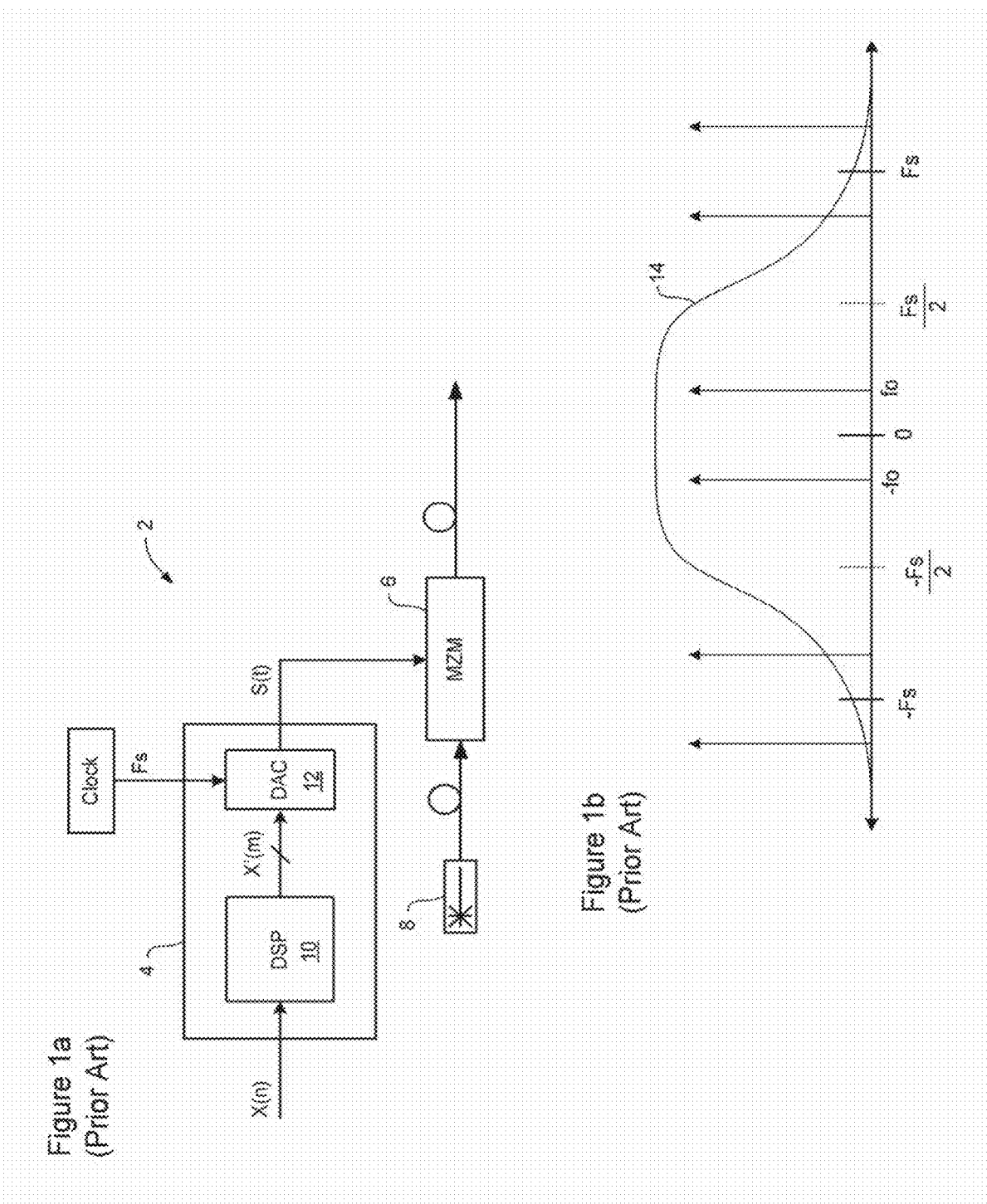
FIGS. 1a and 1b schematically illustrate principal elements and operations of a signal generator known in the art.

Consider the low band path. For a pure sinusoid of frequency fo, the low sub-band digital signal $v_A[m]$ would be $$v_A[m] = \cos\left(f_0 \cdot \frac{2\pi}{F_s}m\right),$$

where m is the sample index, and Fs is the sample rate of the DAC. The analog signal output from an ideal DAC would be $v_A(t)=\cos(2\pi f_0 t)$, where t is time. The output of a real DAC (i.e., one that does not have a perfect $$\frac{\sin x}{x}$$

reconstruction filter, is $v_{A,R}(t)=\Sigma_{n=-\infty}^{\infty} v_A[n]h(t-nT)$ where h(t) is the impulse response of the DAC, and T is the sample time. Neglecting a scaling factor, the representation in the frequency domain of the DAC output will be, $$V_{A,R}(f)=[\Sigma_{n=-\infty}^{\infty} v_A(f-F_s k)]H(f)$$

which is made up of copies of the ideal output, filtered by the response of the DAC. This is shown in FIG. 1b.

The signal generator is required to generate frequency content from 0 to ±Fs. Within this range, it can be seen from FIG. 1b that for a given frequency of fo, the output of the DAC will have spectral components at $-Fs+f_0$, $-f_0$, $f_0$ and $Fs-f_0$.

If the amplitude of the spectral component at $f_0$ is A, then the respective amplitudes of each of the four spectral components will be,

| Frequency | Complex Amplitude |
|---|---|
| $-Fs + f_0$ | A |
| $-f_0$ | A* |
| $f_0$ | A |
| $Fs - f_0$ | A* | where ( )* is the complex conjugate. The spectral components are filtered by the response of the DAC, and other subsequent electrical elements in the signal path, so that the complex amplitude of the corresponding frequency components in the Low-band analog signal $S_A(t)$ will be,

| Frequency | Complex Amplitude |
|---|---|
| $-Fs + f_0$ | $A\, H_A(-Fs + f_0)$ |
| $-f_0$ | $A^*\, H_A(-f_0)$ |
| $f_0$ | $A\, H_A(f_0)$ |
| $Fs - f_0$ | $A^*\, H_A(Fs - f_0)$ | where $H_A(f)$ is the total equivalent response of the low sub-band signal path.

Up-stream of the mixer, the high sub-band signal path operates in a similar manner, so that the complex amplitude of the corresponding frequency components in analog signal input to the mixer will be,

| Frequency | Complex Amplitude |
|---|---|
| $-Fs + f_0$ | $B\, H_{B1}(-Fs + f_0)$ |
| $-f_0$ | $B^*\, H_{B1}(-f_0)$ |
| $f_0$ | $B\, H_{B1}(f_0)$ |
| $Fs - f_0$ | $B^*\, H_{B1}(Fs - f_0)$ | where B is the amplitude of the spectral component at $f_0$, and $H_{B1}(f)$ is the Fourier transform of the DAC impulse response and other components in the High sub-band signal path between the DAC and the input to the mixer. The mixer can be modeled as an ideal mixer, followed by filtering, $H_M(f)$. Therefore, the output of the mixer will be,

| Frequency | Complex Amplitude |
|---|---|
| $-Fs + f_0$ | $B\ H_B(-f_0)\ H_M(-Fs + f_0)$ |
| $-f_0$ | $B^*\ H_B(Fs - f_0)\ H_M(-f_0)$ |
| $f_0$ | $B\ H_B(-Fs + f_0)\ H_M(f_0)$ |
| $Fs - f_0$ | $B^*\ H_B(-f_0)\ H_M(Fs - f_0)$ |

The important result from the mixing is that the order of the original amplitudes (i.e., B, B*) is maintained. Therefore, the filtering from the DAC impulse response, mixer, and other components in the high sub-band signal path can be replaced by a total equivalent filter, which for convenience will be denoted $H_B(f)$. Thus:

| Frequency | Complex Amplitude |
|---|---|
| $-Fs + f_0$ | $B\ H_B(-Fs + f_0)$ |
| $-f_0$ | $B^*\ H_B(-f_0)$ |
| $f_0$ | $B\ H_B(f_0)$ |
| $Fs - f_0$ | $B^*\ H_B(Fs - f_0)$ |

Calculation of the Signals

As all signals are real, the Fourier transforms are all conjugate symmetric, so the following discussion will reference only the positive frequencies.

To calculate the required sub-band digital signals $v_A[m]$ and $v_B[m]$ for input to the two DACs, the following steps are carried out:

The responses, $H_A(f)$ and $H_B(f)$ can be measured, using methods known in the art. In some embodiments, these responses are measured at each one of a plurality of frequencies where i is an index. These frequencies may correspond with respective tap frequencies of a Fast Fourier Transform (FFT) block. Thus, for example, the responses may be measured at each of 256 frequencies $f_i$, i=0 ... 255, corresponding with the tap frequencies of a 256-tap FFT block.

As the desired output signal S(t) is periodic, the Fourier transform can be found easily using the FFT. In the frequency domain, the amplitude spectral pairs of the desired output signal S(f), are specified as follows (for the range $f_i$= 0 ... Fs/2):

| Frequency | Complex Amplitude |
|---|---|
| $f_i$ | $C_{LOW, i}$ |
| $Fs - f_i$ | $C_{HIGH, i}$ | where $C_{LOW,i}$ or $C_{HIGH,i}$ are the complex amplitudes of the respective spectral components.

The responses are found at the frequency pair,

| Frequency | Response | Response |
|---|---|---|
| $f_i$ | $H_A(f_i)$ | $H_B(f_i)$ |
| $Fs - f_i$ | $H_A(Fs - f_i)$ | $H_B(Fs - f_i)$ |

The total output is the sum of the two DAC output signal paths, $$C_{LOW,i} = H_A(f_i)A_i + H_B(f_i)B_i$$

$$C_{HIGH,i} = H_A(Fs-f_i)A^*_i + H_B(Fs-f_i)B^*_i$$

These two equations can be cast into matrix form, $$\begin{bmatrix} H_A(f_i) & H_B(f_i) \\ H^*_A(Fs - f_i) & H^*_B(Fs - f_i) \end{bmatrix} \begin{bmatrix} A_i \\ B_i \end{bmatrix} = \begin{bmatrix} C_{LOW,i} \\ C^*_{HIGH,i} \end{bmatrix}$$

So long as the 2×2 response matrix is invertible, then DAC controlled spectral amplitudes, $A_i$ and $B_i$ can be found as $$\begin{bmatrix} A_i \\ B_i \end{bmatrix} = \begin{bmatrix} H_A(f_i) & H_B(f_i) \\ H^*_A(Fs - f_i) & H^*_B(Fs - f_i) \end{bmatrix}^{-1} \cdot \begin{bmatrix} C_{LOW,i} \\ C^*_{HIGH,i} \end{bmatrix}$$

and the required digital sub-band signals $v_A[m]$ and $v_B[m]$ found by computing the Inverse Fast Fourier Transform (IFFT) of $A_i$ and $B_i$, respectively. For embodiments in which the desired output signal S(t) is a periodic signal having a known bit (or symbol) sequence and periodicity, these calculations can be implemented in the DSP using methods known in the art.

It has been found that some values of the respective phase delays for the LO of the mixer, and the high sub-band path to the input of the mixer can cause small determinants for the 2×2 response matrix. The best scheme appears to be setting the time domain impulse response maximum for the high sub-band path $$\frac{1}{2Fs}$$

after the maximum for the impulse response for the low sub-band path.

Experimental Results

Figure 6:
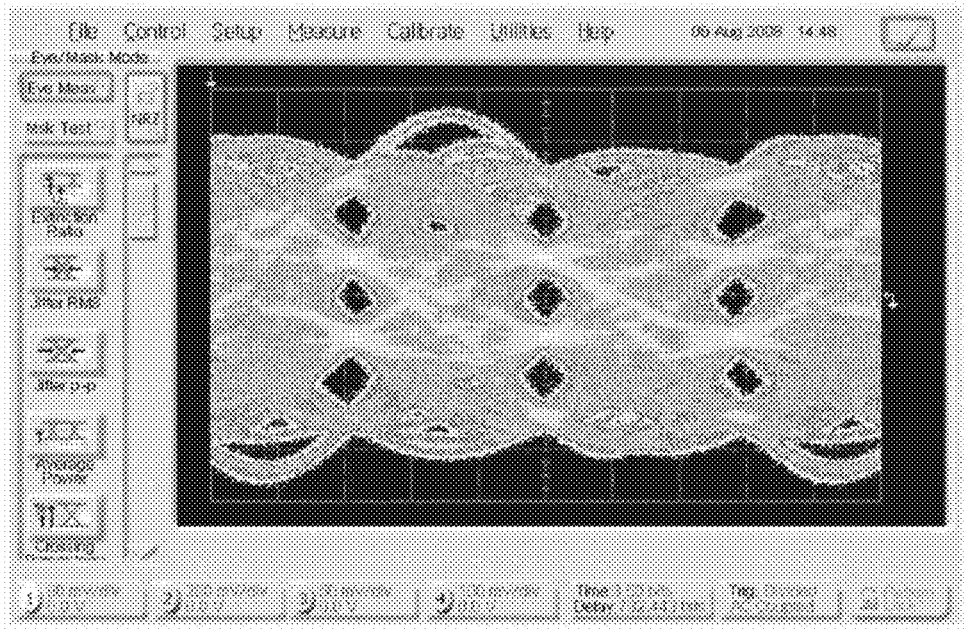
FIG. 6 is a screen-print of a signal analyser showing a measured eye diagram of a signal generated using a signal generator in accordance with an embodiment of the present invention.

A 30 GBaud (giga-symbol per second) periodic analog signal was generated and measured. This signal has four analog levels. A wideband RF amplifier with bandwidth suitable to 30 GBaud was used as an anti-aliasing filter. FIG. 6 is a screen-print of a signal analyser showing the eye diagram measured at a receiver.

Figure 7:
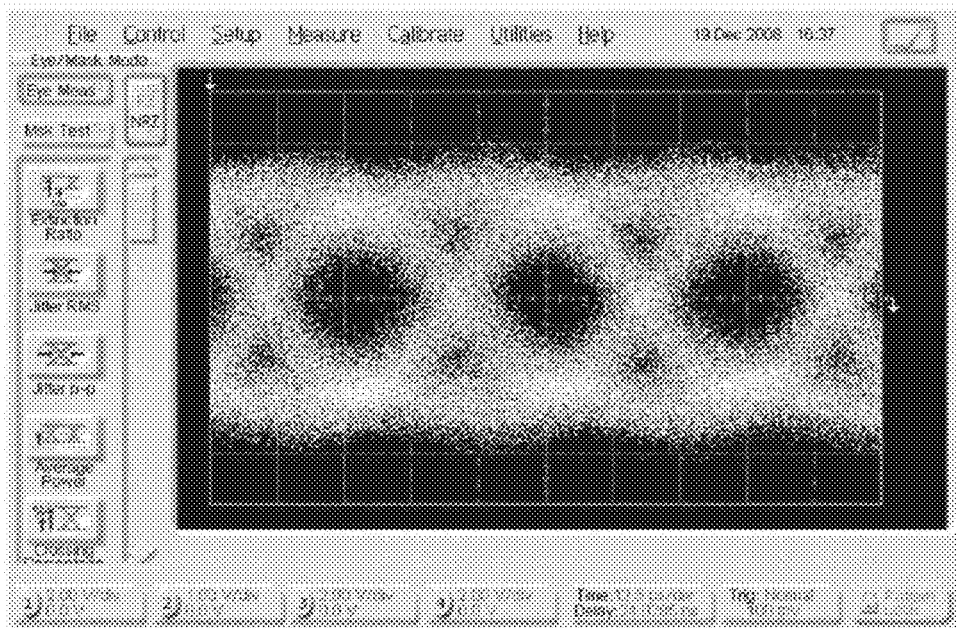
FIG. 7 is a screen-print of a signal analyser showing a measured eye diagram of another signal generated using a signal generator in accordance with an embodiment of the present invention.
Figure 8:
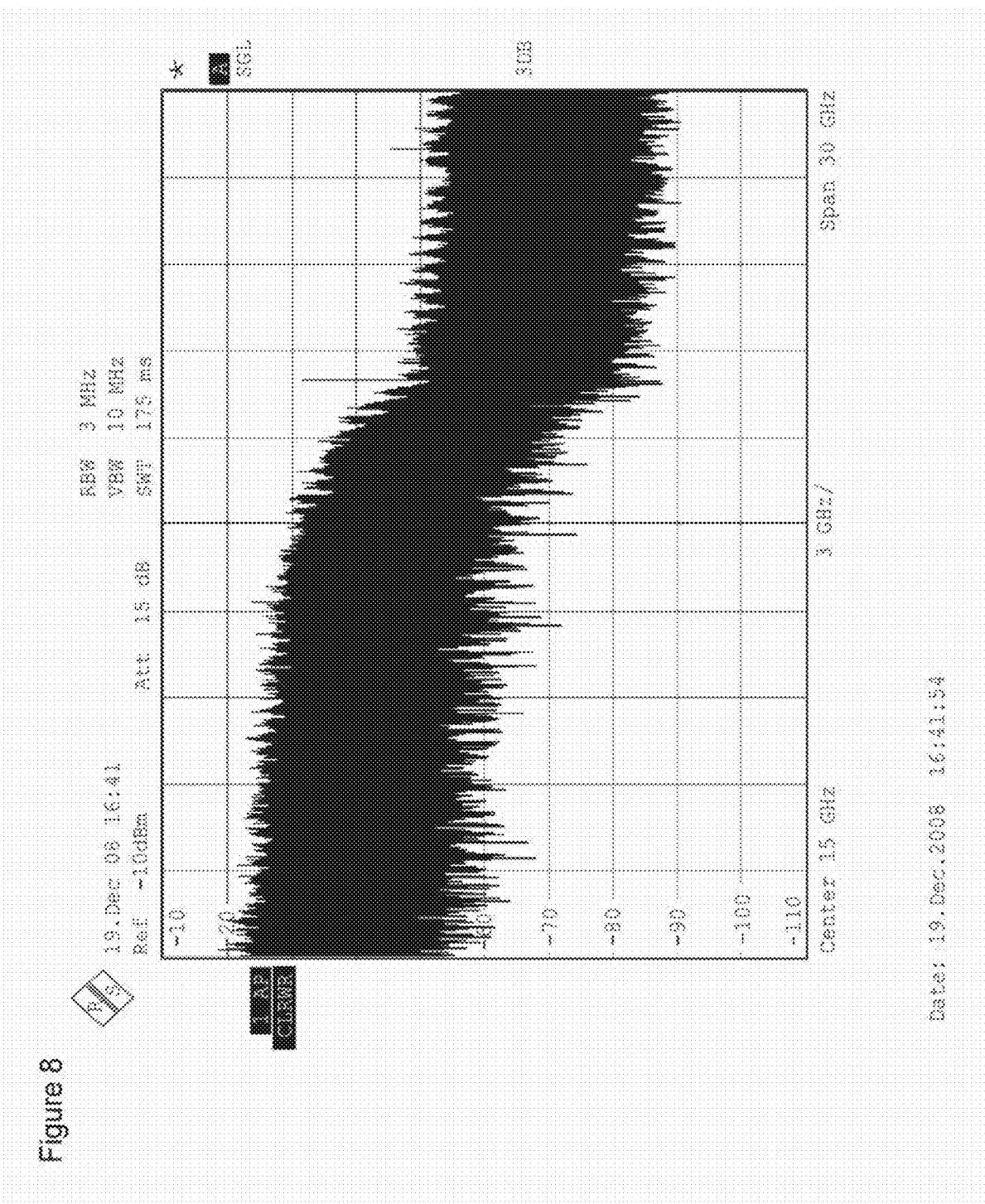
FIG. 8 is a screen-print of a spectrum analyser showing a measured spectrum of the signal of FIG. 7.

A 28 GBaud periodic analog signal was generated and measured. FIG. 7 is a screen-print of a signal analyser showing the eye diagram measured at a receiver. The spectral shape of the signal has been adjusted to give the best performance in the particular system under test, and so the eye appears more square than rounded. FIG. 8 is a screen-print of a spectrum analyser showing the measured optical signal spectrum for the upper side band. As may be seen in FIG. 8, the spectrum exhibits a small harmonic at 20 GHz, which is due to LO feed-through from the mixer. The signal rolls-off to a minimum at 20 GHz, by design, and the low-pass filter removes aliased spectral content above 20 GHz.

In the forgoing description, the desired output signal S(t) is a periodic signal having a known bit (or symbol) sequence and periodicity. Such a signal is commonly used for evaluating performance of network components and systems, for example by generating the eye diagrams of FIGS. 6 and 7. In cases where it is desired to transmit subscriber data traffic, the output signal S(t) is not periodic, and the sequence of symbols is not known in advance. FIGS. 9a and 9b illustrate representative DSPs 18 for generating the digital sub-band signals $v_A[m]$ and $v_B[m]$ based on a subscriber data signal x[n] using the methods of the present invention.

In the embodiment of FIG. 9a, the DSP 18 comprises an encoding block 50 which receives and processes the subscriber data signal x[n] to generate a digital symbol stream X[m] to be transmitted. In some embodiments, the subscriber data signal x[n] may be a serial bit stream, but it could also be any type of digital signal such as, but not limited to a quantized signal. The encoding block 50 may implement any of a variety of algorithms including, but not limited to: encoding the subscriber data signal x[n] using a desired encoding scheme such as M-ary PSK or QAM; applying Forward Error Correction (FEC); and pre-distortion to compensate link impairments such as dispersion. In some embodiments, the symbols of the digital symbol stream X[m] may be complex valued symbols.

During each clock cycle, a set of M/2 successive symbols output from the encoder block 50 are deserialized (at 52) to generate a parallel input vector $\{r_{NEW}\}$. This input vector is combined with the input vector of the previous cycle $\{r_{OLD}\}$ 54, and the resulting M-valued input array supplied to an FFT block 56, which computes an array $\{R\}$ representing the spectrum of the M-valued input array. The FFT output array $\{R\}$ is then supplied to a frequency-domain processor (FDP) 58, which implements the periodic convolution algorithm described above to generate corresponding sub-band arrays $\{A\}$ and $\{B\}$ containing the respective complex amplitudes of the spectral components for each digital sub-band signal. Each of the sub-band arrays $\{A\}$ and $\{B\}$ is processed using a respective IFFT block $60_A, 60_B$ to generate corresponding M-valued output vectors $\{v^A\}$ and $\{v^B\}$ $62_A, 62_B$. The low-band output vector $\{v^A\}$ can be divided into a pair of M/2-valued low sub-band vectors $\{v^A_{OLD}\}$ and $\{v^A_{NEW}\}$ respectively representing the sub-band signal $v_A[m]$ for the current and previous clock cycles. Similarly, the high-band output vector $\{v^B\}$ can be divided into a pair of M/2-valued high sub-band vectors $\{v^B_{OLD}\}$ and $\{v^B_{NEW}\}$ respectively representing the sub-band signal $v_B[m]$ for the current and previous clock cycles. Accordingly, the respective sub-band signals $v_A[m]$ and $v_B[m]$ for the current clock cycle can be obtained by serializing the respective sub-band vectors $\{v^A_{NEW}\}$ and $\{v^B_{NEW}\}$, and discarding the vectors $\{v^A_{OLD}\}$ and $\{v^B_{OLD}\}$ for the previous clock cycle.

If desired the resulting sub-band signals $v_A[m]$ and $v_B[m]$ can be retimed, for example by using a decimation function (not shown), to match the DAC symbol rate.

An advantage of the arrangement of FIG. 9a is that each input vector $\{r\}$ is processed through the signal generator, between the input of the FFT and the output of the IFFT blocks, in each of two successive clock cycles. This effectively converts the digital symbol stream X[m] into a periodic signal, so that the cyclic convolution algorithm described above can be used.

The DSP 18 of FIG. 9a may be used in a signal generator of a high-speed optical transmitter. In this case, the output analog signal S(t) is used to drive an electrical-to-optical converter (not shown), and the encoding block 50 may also implement a pre-distortion to compensate non-linearities of the entire signal path between the DSP output and the output of the electrical-to-optical converter. In embodiments in which the desired output analog signal S(t) is a periodic signal having a known bit (or symbol) sequence and periodicity, an emulation of the DSP 18 of FIG. 9a may be used to process the known bit (or symbol) sequence, represented as input signal x[n], to obtain the digital sub-band signals $v_A[m]$ and $v_B[m]$, which can then be saved in a memory. In this case, a signal generator 16 can be implemented using a simplified DSP 18 of a type shown in FIG. 9b, in which a high-speed digital controller 64 operates to retrieve successive pre-computed samples of the digital sub-band signals $v_A[m]$ and $v_B[m]$ from memory 66 at the required sample rate Fs, and output the samples to the sub-band path DACs 24.

Figure 10:
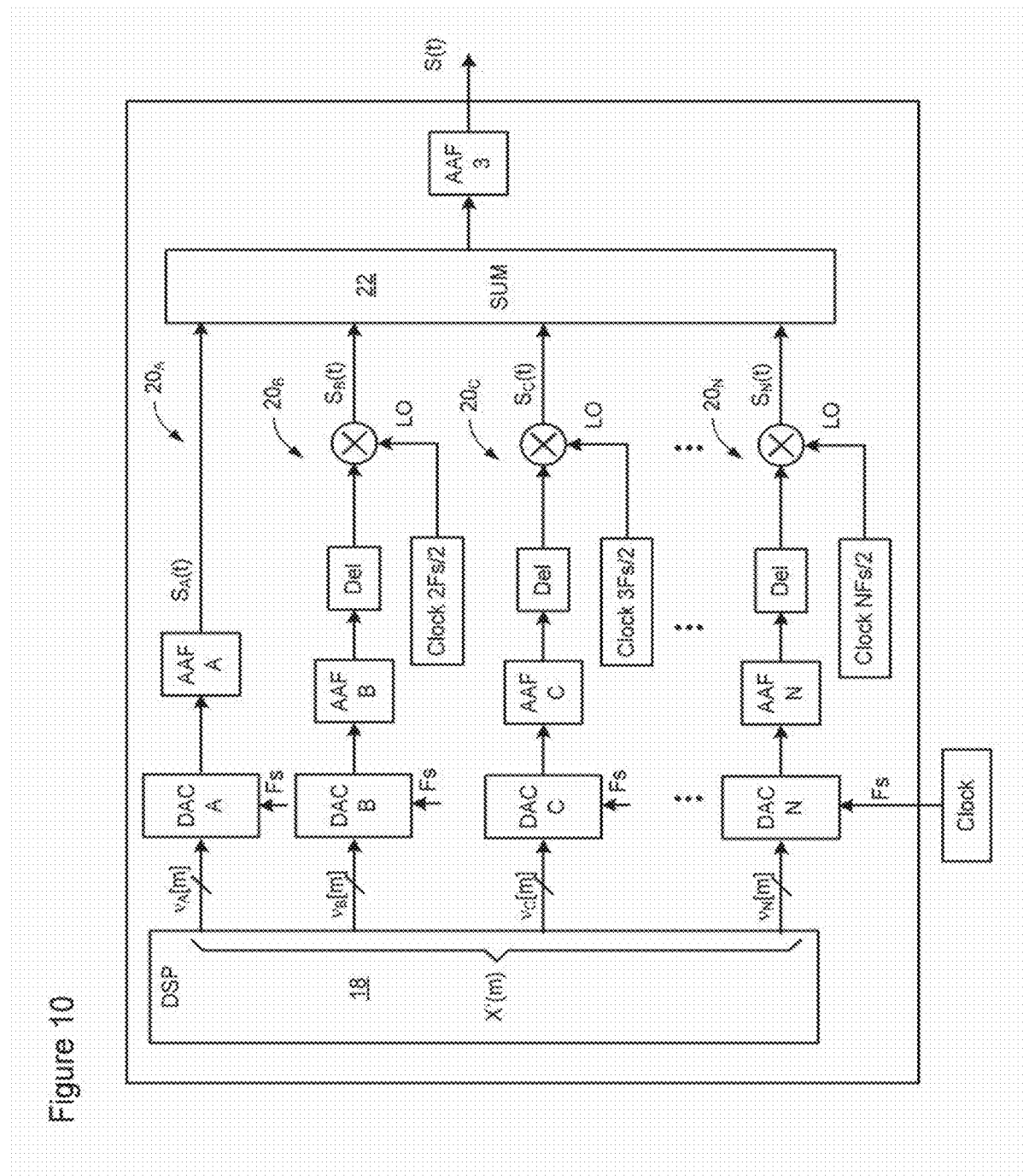
FIG. 10 is a block diagram schematically illustrating a signal generator in accordance with a third representative embodiment of the present invention.

In the embodiments illustrated in FIGS. 2 and 4, the signal generator 16 has a low sub-band path $20_A$ and a single high-sub-band path $20_B$, which operate together to generate an output analog signal S(t) containing frequency components between DC (0 Hz) and Fs; that is, where N=2. Those of ordinary skill in the art will recognise that this architecture can be extended for N>2, by adding additional high-band signal paths as needed. FIG. 10 illustrates a generalized example, in which N sub-band paths 20 are provided. Each of the high sub-band paths $20_B$-$20_N$ includes a respective mixer 30 driven with an LO signal having a suitable frequency for up-converting its respective filtered baseband signal to an appropriate RF band. Such an arrangement can operate substantially as described above, but in this case, all of the analog sub-band signals are combined to obtain an output analog signal S(t) having frequency components within a spectral range extending between DC and $$\frac{N \cdot Fs}{2}.$$

FIGS. 9a and 9b show specific embodiments of the DSP 18, which are configured to generate N=2 digital sub-band signals $v_A[m]$ and $v_B[m]$. Both of these DSPs 18 can be modified to facilitate generation of N>2 digital sub-band signals $v_X[m]$. In view of the foregoing teaching, such modifications are considered to be within the purview of those of ordinary skill in the art, and thus will not be discussed in detail herein.

Figure 11:
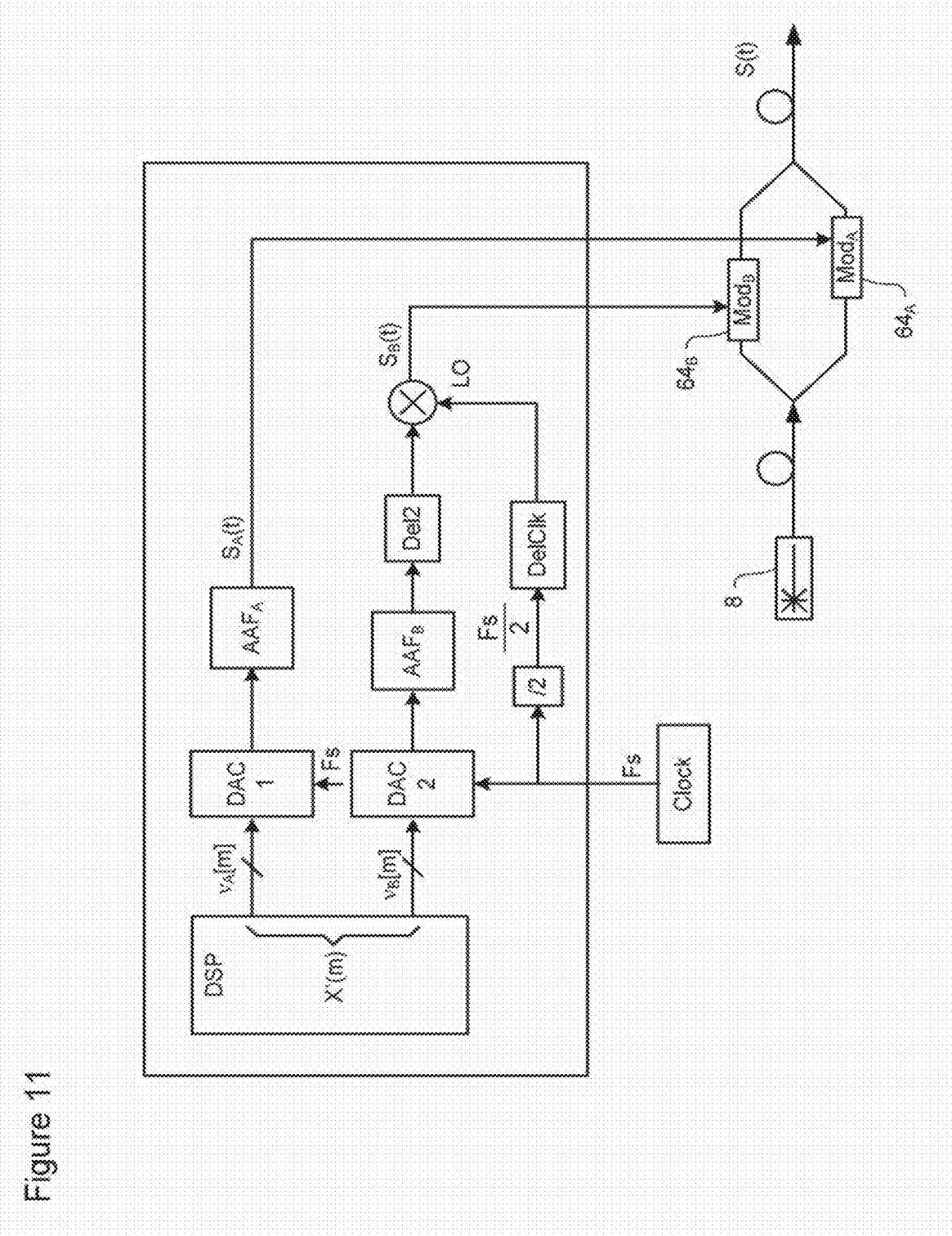
FIG. 11 is a block diagram schematically illustrating a signal generator in accordance with a fourth representative embodiment of the present invention.

In the forgoing embodiments, an RF combiner 22 is used to combine the analog sub-band signals, in the electrical domain, to obtain the output analog signal S(t). It will be appreciated, however, that other methods may be used to combine the analog sub-band signals. For example, the sub-band signals may be combined optically, as shown in FIG. 11. In this case, each analog sub-band signal is used to drive a respective optical modulator 64 (such as, for example, a Mach-Zehnder modulator). The desired combination of spectral ranges is obtained by separately modulating the optical carrier signal through the optical modulators in parallel, and then combining the resulting modulated optical signals. Naturally, the arrangement of FIG. 11 may be readily extended, in a manner directly analogous to that described above with reference to FIG. 10, to the general case of a signal generator having N sub-band paths 20.

Although the invention has been described with reference to certain specific embodiments, various modifications thereof will be apparent to those skilled in the art without departing from the spirit and scope of the invention as outlined in the claims appended hereto.

What is claimed is:
1. A high-speed signal generator comprising:
a digital signal processing (DSP) block configured to process an input digital signal to generate in parallel a first digital sub-band signal having frequency components within a first spectral range and a second digital sub-band signal having frequency components within the first spectral range;
a first Digital-to-Analog Converter (DAC) configured to process the first digital sub-band signal to generate a first analog sub-band signal, some frequency components of the first analog sub-band signal being substantially adjacent to zero frequency;
a second DAC configured to process the second digital sub-band signal to generate a second analog sub-band signal;
a mixer configured to heterodyne the second analog sub-band signal with a Local Oscillator (LO) signal having a selected LO frequency, to upconvert the second analog sub-band signal to an RF band; and
a combiner configured to combine the first analog sub-band signal and the upconverted second analog sub-band signal to generate an output analog signal having frequency components covering a substantially continuous spectral range that includes the first spectral range and that is substantially wider than a width of the first spectral range.

2. The signal generator as claimed in claim 1, wherein the combiner is configured to combine the first analog sub-band signal and the upconverted second analog sub-band signal in the optical domain.

3. The signal generator as claimed in claim 1, wherein the mixer is an image rejection mixer.

4. The signal generator as claimed in claim 1, wherein the mixer is a double side-band mixer.

5. The signal generator as claimed in claim 1, further comprising at least one delay element configured to impose a predetermined phase offset between the first analog sub-band signal and the second analog sub-band signal.

6. The signal generator as claimed in claim 5, wherein the predetermined phase offset is fixed.

7. The signal generator as claimed in claim 5, wherein the predetermined phase offset is adjustable.

8. The signal generator as claimed in claim 5, wherein the predetermined phase offset is not zero.

9. The signal generator as claimed in claim 1, wherein the DSP block comprises:
an encoding block configured to process the input digital signal to generate an encoded digital signal representative of the output analog signal; and
a filter block configured to generate the first digital sub-band signal and the second digital sub-band signal by processing the encoded digital signal in the frequency domain.

10. The signal generator as claimed in claim 1, wherein the DSP block comprises:
an encoding block configured to process the input digital signal to generate an encoded digital signal representative of the output analog signal; and
a filter block configured to generate the first digital sub-band signal and the second digital sub-band signal by processing the encoded digital signal in the time domain.

11. In an optical communications system, a transmitter comprising:
a digital signal processing (DSP) block configured to process an input digital signal to generate in parallel a first digital sub-band signal having frequency components within a first spectral range and a second digital sub-band signal having frequency components within the first spectral range;
a first Digital-to-Analog Converter (DAC) configured to process the first digital sub-band signal to generate a first analog sub-band signal, some frequency components of the first analog sub-band signal being substantially adjacent to zero frequency;
a second DAC configured to process the second digital sub-band signal to generate a second analog sub-band signal;
a mixer configured to heterodyne the second analog sub-band signal with a Local Oscillator (LO) signal having a selected LO frequency, to upconvert the second analog sub-band signal to an RF band; and
a combiner configured to combine the first analog sub-band signal and the upconverted second analog sub-band signal to generate an output analog signal having frequency components covering a substantially continuous spectral range that includes the first spectral range and that is substantially wider than a width of the first spectral range.

12. The transmitter as claimed in claim 11, wherein the combiner is configured to combine the first analog sub-band signal and the upconverted second analog sub-band signal in the optical domain.

13. The transmitter as claimed in claim 11, wherein the mixer is an image rejection mixer.

14. The transmitter as claimed in claim 11, wherein the mixer is a double side-band mixer.

15. The transmitter as claimed in claim 11, further comprising at least one delay element configured to impose a predetermined phase offset between the first analog sub-band signal and the second analog sub-band signal.

16. The transmitter as claimed in claim 15, wherein the predetermined phase offset is fixed.

17. The transmitter as claimed in claim 15, wherein the predetermined phase offset is adjustable.

18. The transmitter as claimed in claim 15, wherein the predetermined phase offset is not zero.

19. The signal generator as claimed in claim 1, wherein the combiner is configured to combine the first analog sub-band signal and the upconverted second analog sub-band signal in the electrical domain.

20. The transmitter as claimed in claim 11, wherein the combiner is configured to combine the first analog sub-band signal and the upconverted second analog sub-band signal in the electrical domain.

* * * * *